Aug. 19, 1952  S. JENCICK  2,607,328
DIESEL MOTOR

Filed Dec. 23, 1948  6 Sheets-Sheet 1

INVENTOR.
STEPHEN JENCICK
BY
Milburn & Milburn
ATTORNEYS

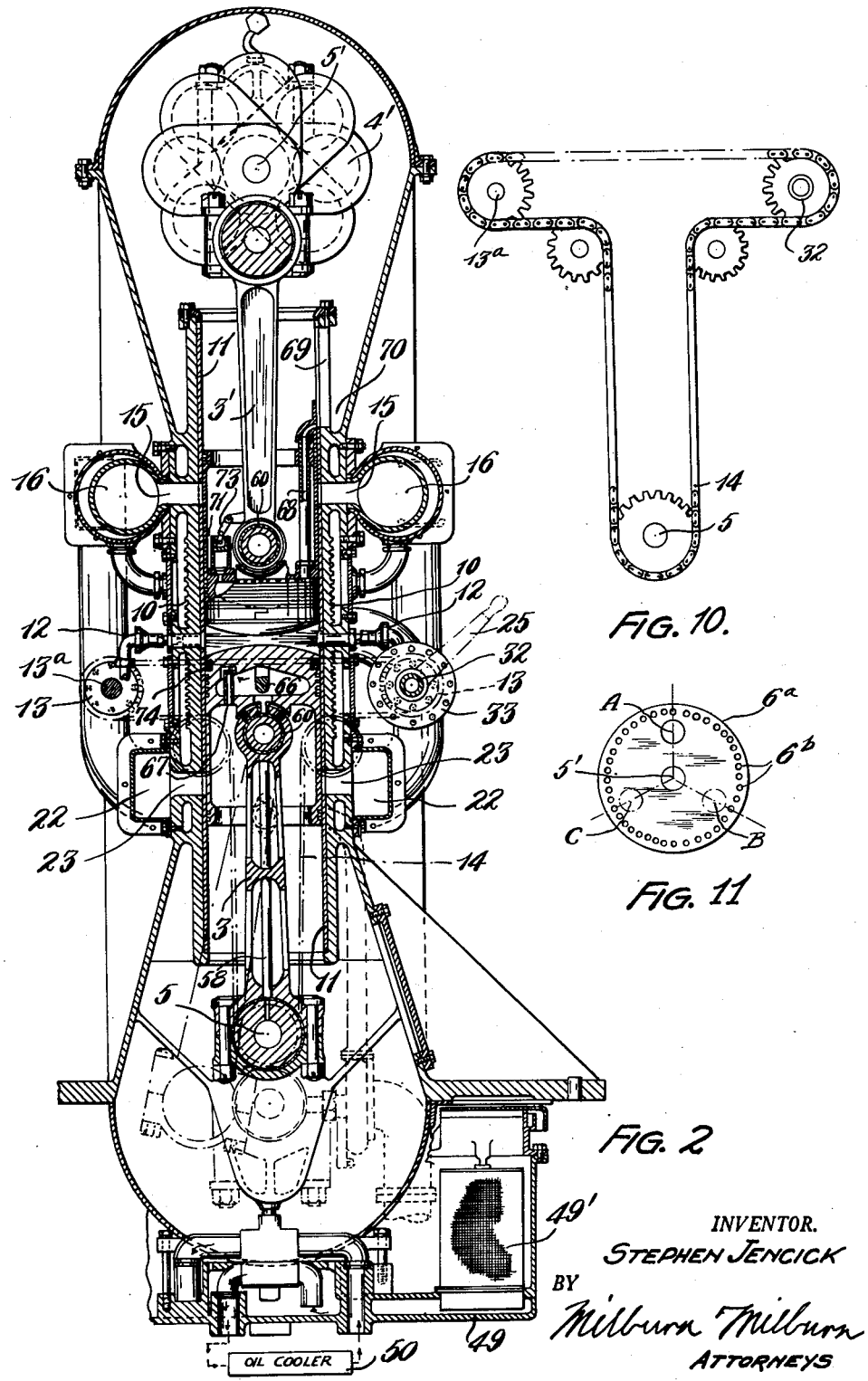

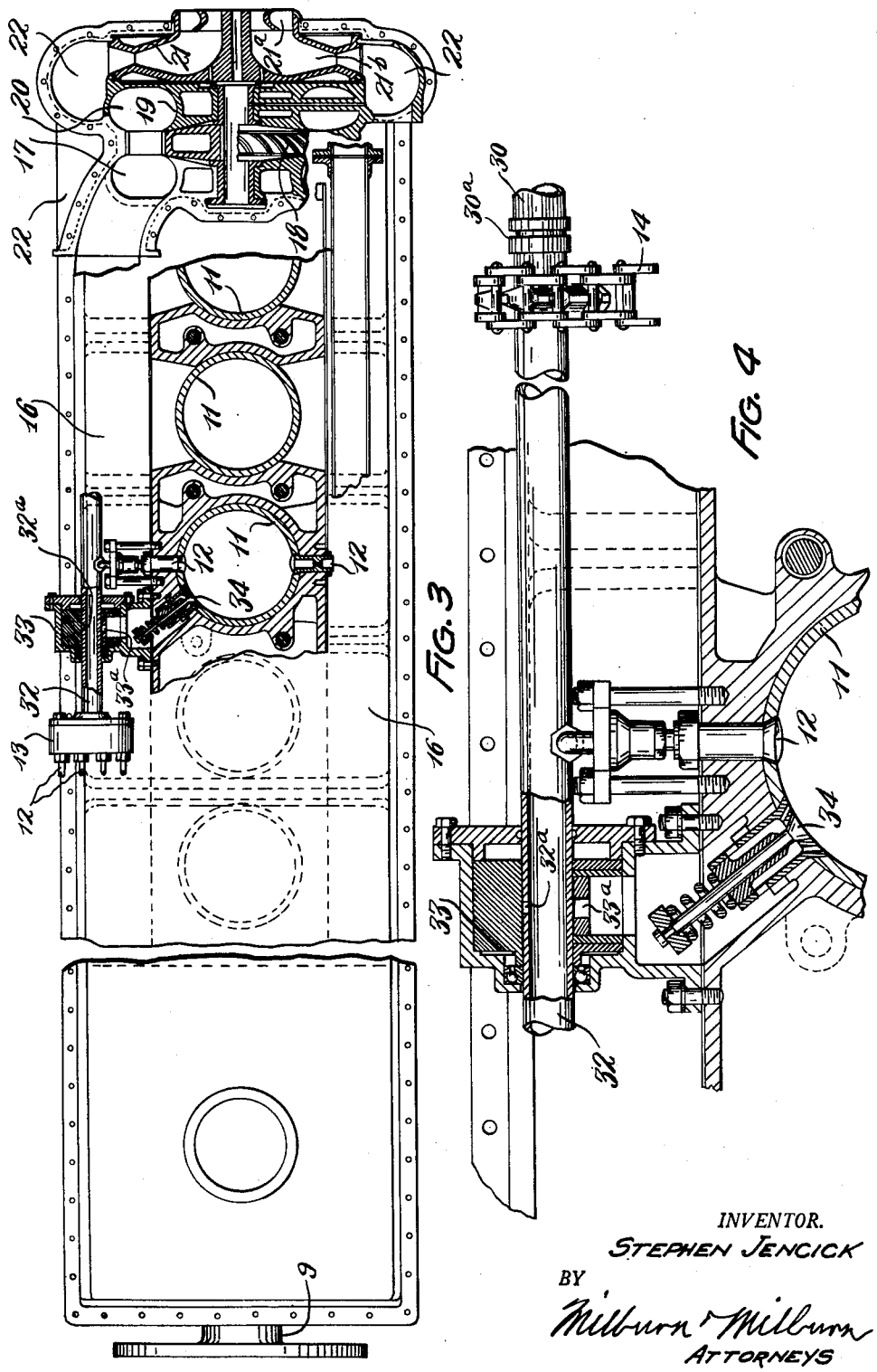

Aug. 19, 1952  S. JENCICK  2,607,328
DIESEL MOTOR

Filed Dec. 23, 1948  6 Sheets-Sheet 4

INVENTOR.
STEPHEN JENCICK
BY
Milburn & Milburn
ATTORNEYS

INVENTOR.
STEPHEN JENCICK
BY
Milburn & Milburn
ATTORNEYS

Patented Aug. 19, 1952

2,607,328

UNITED STATES PATENT OFFICE 2,607,328

DIESEL MOTOR

Stephen Jencick, Chagrin Falls, Ohio

Application December 23, 1948, Serial No. 67,049

16 Claims. (Cl. 123—51)

This invention relates to the art of diesel motors and is an improvement particularly upon the well-known Junkers type of motor.

The Junkers type of motor is generally acknowledged by automotive engineers throughout the world as having the greatest thermal efficiency and as being capable of delivering the greatest output of power per cubic inch piston displacement in stationary application at low R. P. M. While the Junkers type of motor has proved very satisfactory in general, its application to marine installations, as for instance submarines, has resulted in failure because of the weakness of its long connecting rods between the upper pistons and the main shaft below. In addition, the two extra cranks required for each cylinder, make the over-all length rather extreme in a multicylinder design and add considerable torsional reaction which causes vibration and consequent damage. In aviation motors, where two crank shafts are used, these two shafts are connected by a train of gearing; and, while high speeds are possible for small bore motors, they are not practical in large bore motors or in motors of extremely high torque.

My present invention comprises certain improvements which are based upon the above considerations and also other improved features, all of which constitute objects of this invention, as will appear from the following description and claims when considered together with the accompanying drawings.

Accordingly, one object of my present invention is to devise a diesel motor which will require less space per horse-power than the previous form of motor above referred to, or any other motor so far as I am aware, and which will have less torsional reaction than heretofore known.

Another object is to devise such a motor with considerably fewer parts than any other motor known to me.

Another object is to provide an effective means for advancing the exhaust for super-charging, such means forming part of the mechanism herein described.

Another object is to provide an efficient form of motor that will eliminate the troublesome cylinder heads and the entire valve mechanism heretofore employed.

Another object is to devise such a motor with means for delivering lubricating oil to the pistons and piston chambers under pressure so as to increase the operating efficiency and to prolong the life of the motor.

Another object is to provide such a motor with means, operated by the engine exhaust, for operating air pump means for effecting the scavenging and super-charging operations within the compression chambers.

Another object is to devise such a motor with an improved form of valve mechanism for effecting the starting and direction-changing operations.

Another object is to devise such a motor with unitary means for changing the direction of operation of the same without changing the direction of operation of the lubricating oil and water pumps.

Another object is to devise such a motor with an improved fuel-injecting system.

Another object is to devise such a motor with an improved form of piston ring which will fit tightly enough to prevent blowing of gases past the same and, at the same time, will itself provide dependable lubrication so as to preclude danger of over-heating and thus prolong the life of the cylinder lining.

Another object is to devise such a motor with improved means for effecting the removal of excess lubricating oil within the piston chambers and for ensuring most effective and dependable circulation of the same.

Another object is to devise a diesel motor of an improved design that is characterized by the several features of construction as herein set forth.

Fig. 2 is a vertical transverse sectional view, taken near the right-hand end of Fig. 1, and with parts shown in elevation;

Fig. 3 is a top view of my present improved motor with part shown in elevation and parts in section;

Fig. 4 is an enlarged view of parts shown in Fig. 3;

Fig. 10 illustrates the sprocket drive means for operation of the fuel pumps and the tubular air valve member 32; and Fig. 11 shows in elevation one of the two companion disks which constitute means of adjustment in advancing the exhaust for super-charging.

Figure 1:
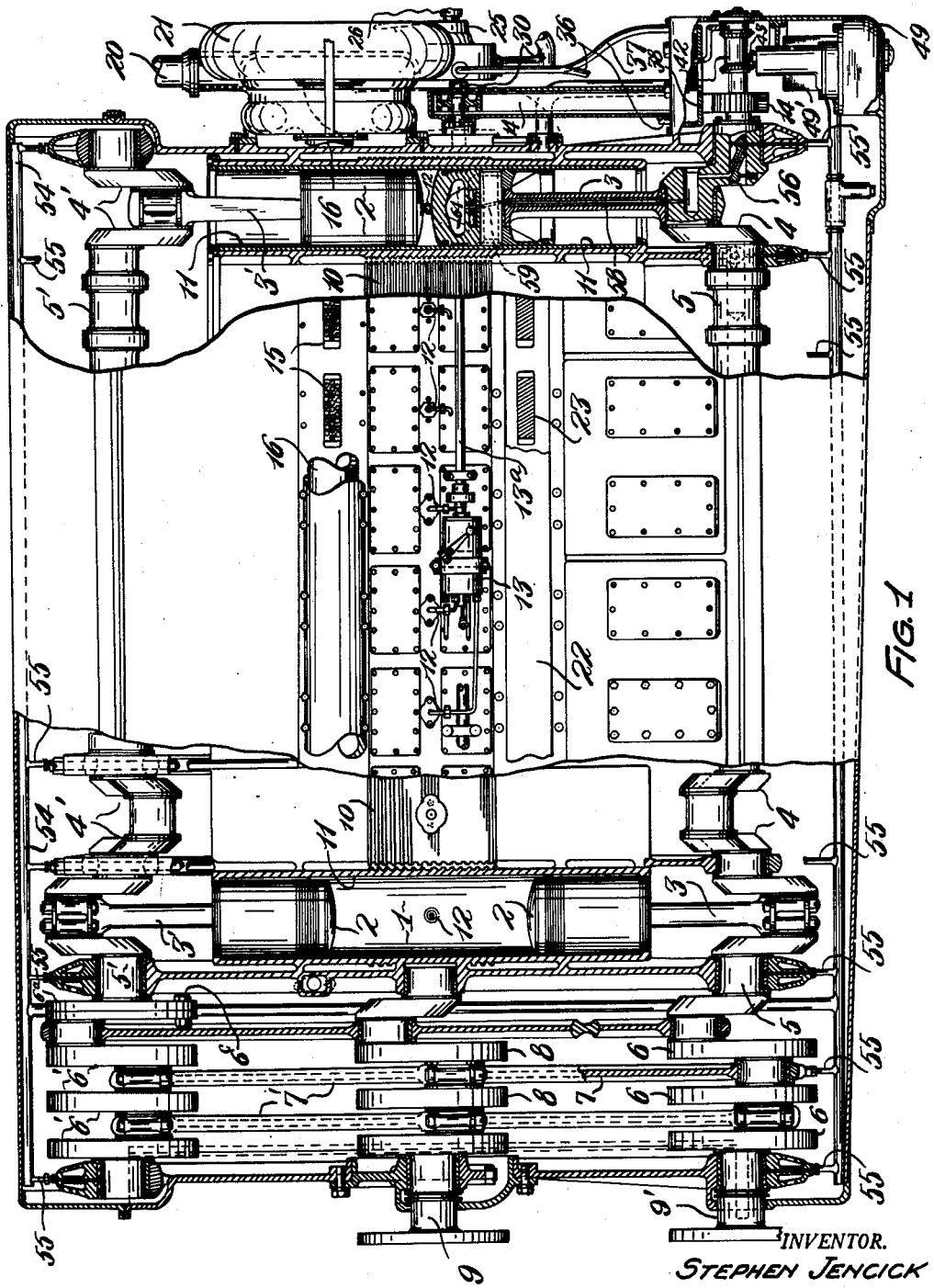
Fig. 1 is a side view of my improved diesel motor with part thereof in elevation and parts thereof shown in section.

It is to be understood that the present form of disclosure is merely for the purpose of illustration and that there might be devised various modifications thereof without departing from the spirit of my invention as herein set forth and claimed.

In the present form of illustration, there is shown a two-cycle eight-cylinder engine in which each cylinder 1 has two pistons 2 with their compression ends facing each other so as to provide a compression chamber therebetween. That is to say, this engine is of the double-piston type. Each piston has pivotally connected thereto a connecting rod 3, 3' which has crank connection at its outer end to the lower and upper crank shafts 5 and 5', respectively. At the one end of the engine, the two crank shafts 5 and 5' have crank disks 6, 6' connected to the three-throw connecting links 7 and 7' which, in turn, have disk connections 8 to the drive shaft 9 midway of the height of the engine. This drive shaft 9 may be connected to a generator, in which event there may be provided a propeller shaft connection 9' from the end of the lower crank shaft 5; or the drive shaft connection 9 may be employed for the propeller shaft.

The outer wall of each cylinder is provided with fins 10 throughout a certain extent thereof for the purpose of cooling and equalizing the cooling area during gas expansion; and there may be a circulation of cooling water through the jacket surrounding the cylinders and these fins 10 by means of a water pump operated by the same shaft which serves to operate also the lubricating oil pump, as will appear from the following.

The interior of each cylinder may be provided with a "dry" type of liner 11 which may be made in three sections in each cylinder in order to facilitate construction as well as assembly of the same.

Each compression chamber is supplied with fuel from a pair of injector nozzles 12 located at diametrically opposite points thereof and the fuel is supplied thereto simultaneously by the injector pumps 13, a separate pump being provided for the series of nozzles 12 on each side of the row of cylinders 1. These fuel pumps 13 are operated through sprocket and chain drive connections 14 from lower crank shaft 5 to the fuel pump shaft 13a and the rotatable hollow air valve tube 32, upon which the fuel pumps 13 are mounted at the two sides of the motor, respectively.

The exhaust gas is discharged from the compression chamber, in each instance, through the oppositely disposed apertured ports 15 which open into the two manifolds 16 along the two opposite sides of the engine. These manifolds 16 lead the exhaust gases to the inlet chambers 17 for impingement against the blades 18 of the turbine 19 and thence to be discharged through the outlets 20. The turbine is thus operated by the exhaust gases for effecting the introduction of outside air through the bucket vanes of the Venturi type of air pump 21 into the manifolds 22 along the opposite sides of the engine. Thence this outside air is supplied through the slotted ports 23 into each of the compression chambers for scavenging the same upon receding movement of the pistons; and this air will be subjected to compression with the fuel between the companion pistons as they approach each other. The bucket vanes are of such form that the outside air is first drawn inwardly through comparatively restricted passages 21a which open inwardly into larger passages 21b, thereby increasing the efficiency of the air pump.

Figure 7:
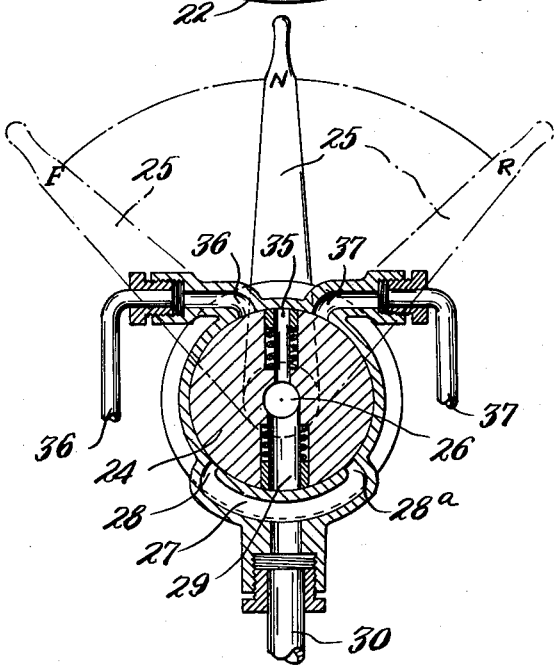
Fig. 7 illustrates the air valve for starting and reversing the direction of the motor, the position of this valve in the entire assembly being indicated at the right-hand end of Fig. 1.
Figure 8:
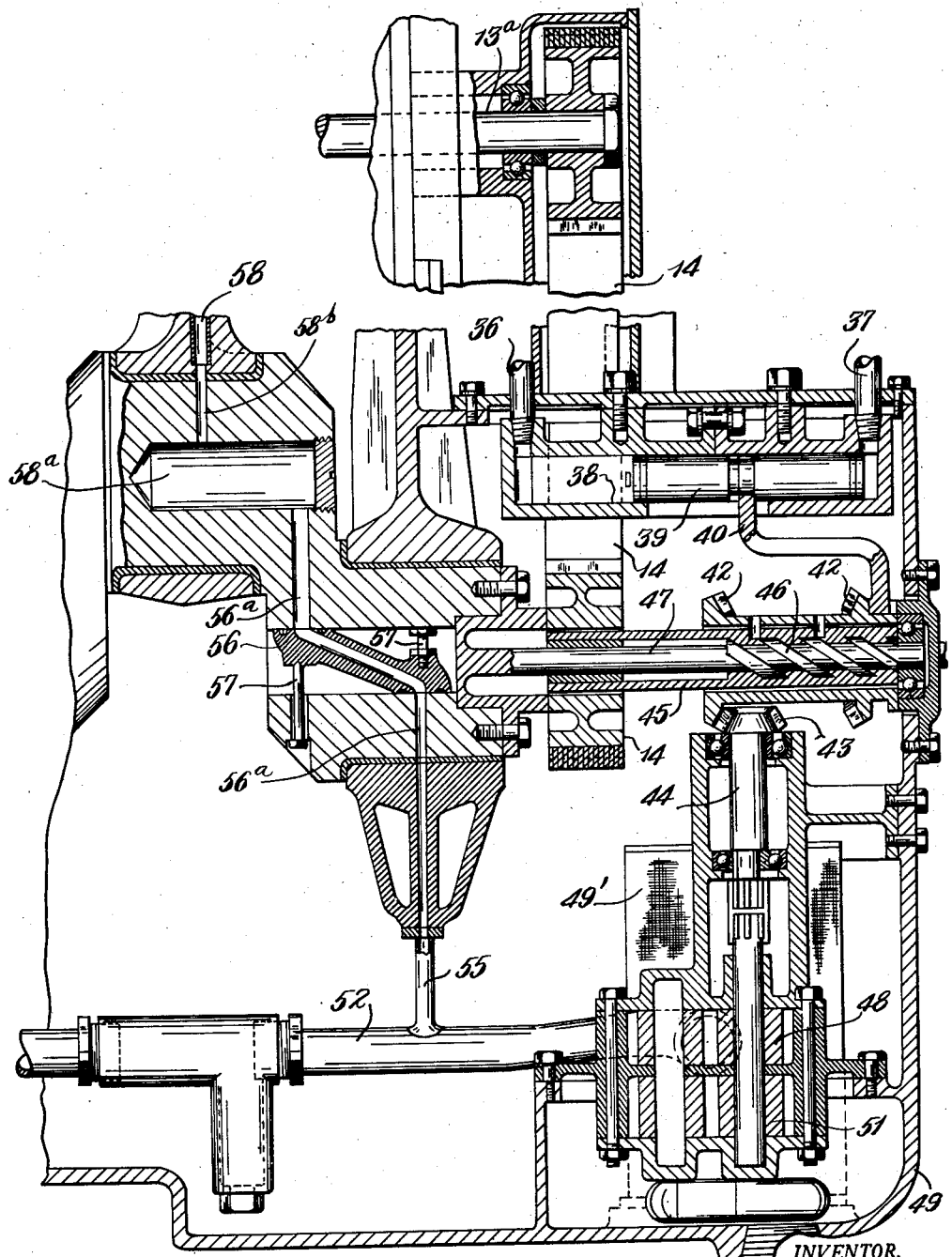
Fig. 8 is an enlarged view illustrating the lower right-hand end part of Fig. 1.

The starting valve mechanism, which is actuated by compressed air, is illustrated in Figs. 3, 4 and 7 of the drawing. The rotatably adjustable valve body 24 is mounted for manipulation by the conveniently located hand lever 25 at one end of the engine and has an axial bore 26 to which a conventional bottle of compressed air may be connected. Surrounding the valve body 24 there is the arcuate-shaped channel 27 which is provided with the ports 28 and 28a at the two ends thereof for communication with the radially extending passage 29 in the valve body 24 so as to establish communication in either case from the bore 26 through the channel 27 and the conduit 30 to the air-distributing rotatable tubular member 32 through suitable connection with stuffing box, as indicated at 30a. One of the ports 28 corresponds to "forward" and the other port 28a corresponds to "reverse," the two corresponding positions of the valve body 24 being ninety degrees apart, as indicated in the present drawing. The "forward," "reverse" and "neutral" positions of the lever 25 are indicated by the initial letters "F," "R" and "N."

As stated, the air conduit 30 is connected to the rotatable hollow tubular valve member 32 which extends along one side of the engine and which has suitably spaced air ports 32a that are located within the housing 33 provided for each cylinder and that co-operate with the companion ports 33a of proper circumferential extent so as to function as an air valve means for distribution of the compressed air in properly timed sequence to the several compression chambers through the normally closed spring valve 34 in the wall of each cylinder 1, each valve 34 being adapted to be opened by the force of the compressed air and to be closed by its spring. In order to start the motor, it may be sufficient to supply the compressed air to only four cylinders; in which case, one of the fuel pumps 13 may be connected to the end of the rotatable hollow tube 32, as indicated in Fig. 3 of the drawing.

The valve body 24 is provided also with the radially extending passage 35 which has communication with the bore 26 and is adapted to be brought into registry at its outer end with the open end of either the tube 36 or the tube 37, the open ends of these two tubes being spaced thirty degrees apart so as to ensure operation thereof prior to setting of the valve mechanism for either "forward" or "reverse" through the ports 28 and 28a. The tubes 36 and 37 extend to air cylinder 38 and open thereinto at such points that the compressed air may be effective upon opposite ends of the plunger 39 for straight-line adjustment of the same in one direction or the other. The arm 40 connects the plunger 39 to the bevel gear train 42 which is adapted to be brought into mesh in either of its two positions with the bevel pinion 43 on the shaft 44 for operation of the lubricating oil and water pumps. The gear train 42 is mounted upon the longitudinally adjustable sleeve 45 which has spline connection with the sprocket 14 for operation of the same and which has its interior surface of helical form for co-operation with the helical end portion 46 of the elastic shaft 47 driven from the lower crank shaft 5 of the engine. Slidable movement of the sleeve 45, co-axially of the shaft 47 in one direction or the other in the manner just described, will effect rotatable adjustment of the sprocket and chain mechanism 14 in the corresponding direction so as to obtain corresponding adjustment of the timing for the injection of compressed air for starting and also the injection of fuel, according to whether there is desired a forward or reverse drive of the engine.

With the arrangement of the bevel gear train 42 and the bevel pinion 43, as just described, there will be ensured an effective drive connection for operation of the lubricating oil and water pumps during operation of the engine in either forward or reverse direction; and, furthermore, this arrangement ensures that the operation of these pumps will be always in the same direction. Also, as above indicated, this adjustment is effected prior to the setting of the air valve for either forward or reverse operation of the engine, this being due to the difference between the angles of thirty and ninety degrees, as above referred to in connection with the air valve mechanism and as indicated in Fig. 7 of the drawings.

The shaft 44 has suitable connection for operation of the upper and lower lubricating oil pumps of the gear type. The upper oil pump 48 is for scavenging and is adapted to force the lubricating oil from the sump 49 through a circuitous passage including the cooler 50 which may be provided with a water jacket in communication with the water jacket around the piston cylinders, as above referred to, and thence to the lower pump 51 which is intended to distribute the oil for lubricating the engine. The pump 51 forces the cooled oil through the tubing 52 along the bottom of the engine, through the tubing 53 up along the side of the engine, and through the tubing 54 along the top thereof. The upper and lower tubings 52 and 54 have branch tubes 55 therefrom to each main bearing of the engine and into each partially hollow crank shaft. Reference will now be had first to the means for directing the lubricant to the lower pistons.

Figure 9:
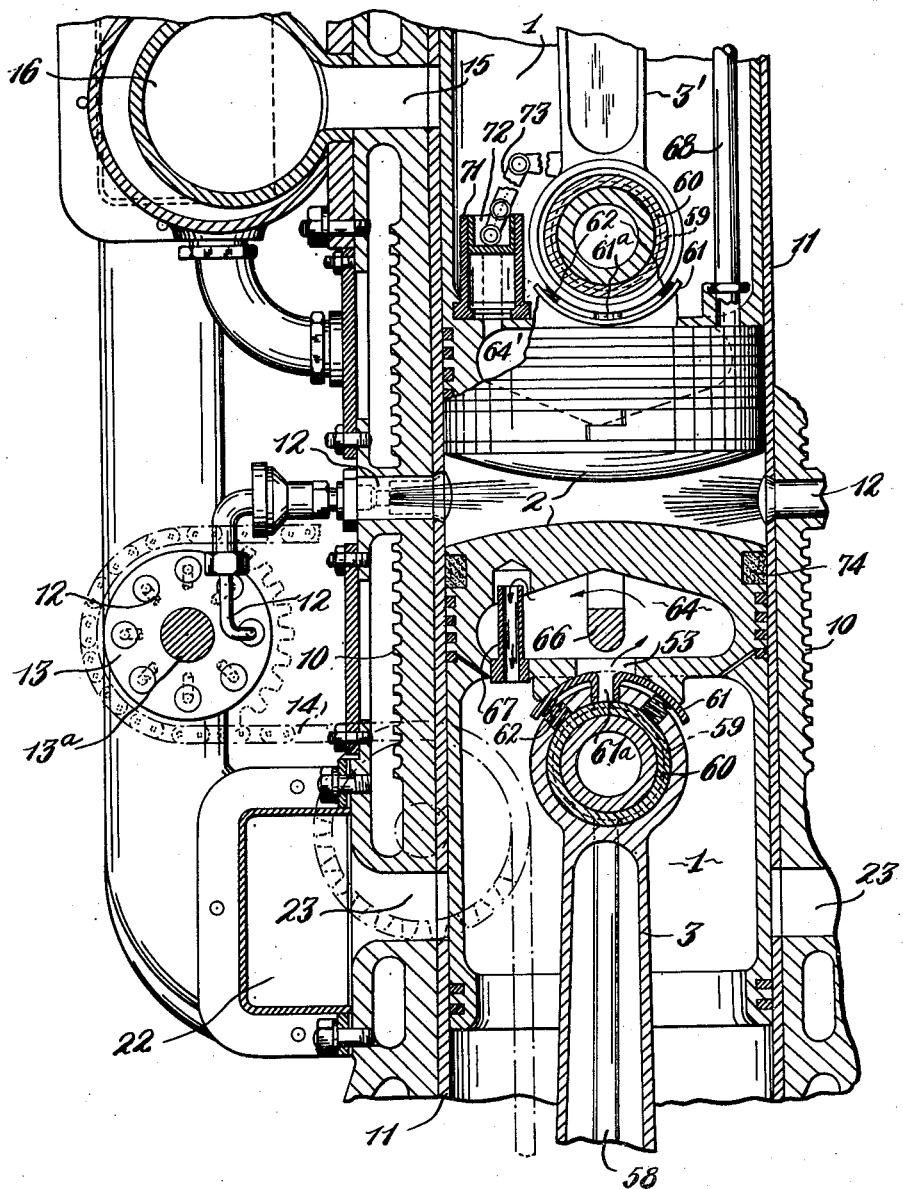
Fig. 9 is an enlarged view of the middle part of Fig. 2.

As a matter of expediency in mechanical construction, a hollow portion may first be formed along a straight line in the crank shaft, and then a hollow casting 56 may be placed with its open ends in registry with the transverse passages 56a therethrough. This casting may be set in position by means of screw bolts 57. The oil may pass from tube 55 through these passages, thence through chamber 58a and passages 58b to the tube 58 provided axially in the channel part of each connecting rod and thence to a circumferential groove 59 in the outer surface of the piston pin bearing 60. From this groove 59 there is a radial passage 61a through the end of the connecting rod, the passage 61a accommodating the middle tubular portion of the curved member 61 which is held by coil springs 62 against the correspondingly curved wall of the piston chamber and which is adapted to serve as an oscillating valve in conjunction with the companion opening 63 through the wall of the chamber 64 of the piston head 2 and into the same, as indicated in Fig. 9 hereof. Any wear will be taken up automatically by the springs 62. Within chamber 64 there is a depending baffle 66 which has an opening near the top thereof to permit passage of oil therethrough and thence to the upper end of tube 67 which extends at its lower end through the bottom wall of the chamber 64. The oil may fall by gravity from the lower end of tube 67 to the crank case therebelow and thence return to the sump 49. This oil will pass through a filter 49' in the sump 49 and then be re-circulated over the same course as before.

Lubricating oil will be supplied to the chamber 64' of each of the upper pistons 2 in the same manner as above described in connection with the lower pistons 2. The overflow of this oil from the upper piston chambers 64', in each instance, will be through the tube 68 which has its lower end mounted upon the piston in communication with the chamber 64' and whose upper open end has slidable engagement with the inner wall of the cylinder and is adapted to discharge such oil out through slot 69 in the cylinder wall and into the channel 70, whence it may return by gravity to the crank case below and to the sump 49 for re-circulation over the same course after passing through the filter 49'.

For the purpose of scavenging the chamber 64' within each upper piston, a small pump 71 may be mounted upon the piston and have communication with the interior of the chamber 64', this pump having a plunger 72 adapted for actuation by the lever 73 connected to the connecting rod 3'. The oscillatory movement of the connecting rod, in each instance, is sufficient for effective reciprocation of the plunger 72 through the lever 73 so as to thereby ensure movement of the lubricating oil from the chamber 64' out through the tube 68.

Each upper and lower piston is provided with a ring 74 of graphite which, by virtue of its inherent characteristics, may have sufficiently tight fit in the cylinder to ensure effective sealing and lubrication without danger of over-heating or excess wear. As a result, there is obtained most effective compression and there is less danger of deterioration of the liner 11 of the cylinder from over-heating.

Figure 5:
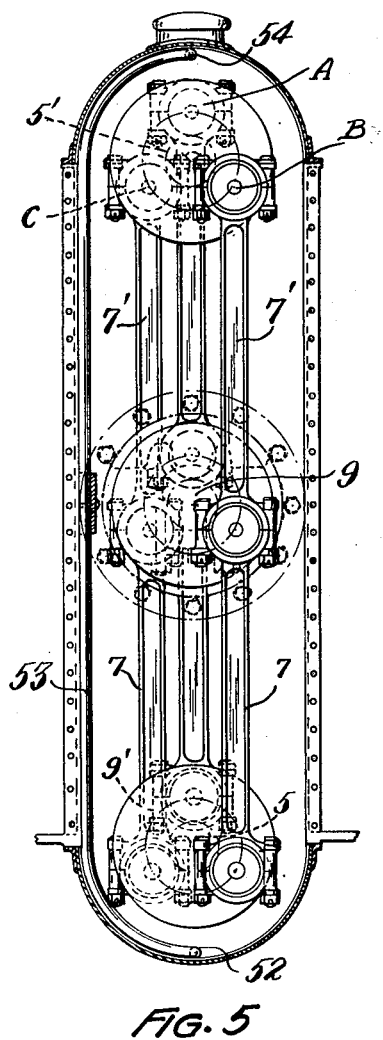
Fig. 5 is a view of the left-hand end of Fig. 1 and with parts broken away.
Figure 6:
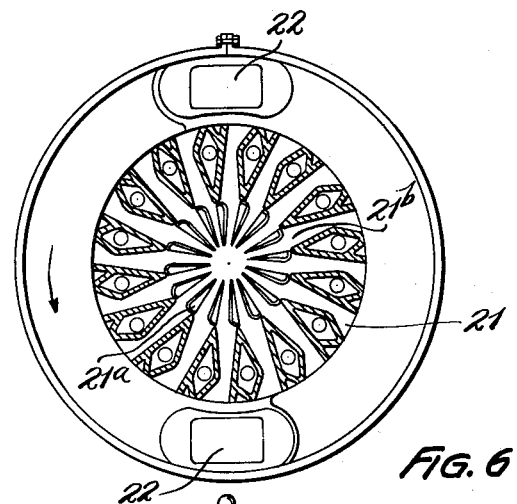
Fig. 6 is a view taken at the right-hand end of Fig. 1 and illustrates the turbine air pump which is further illustrated at the right-hand end of Fig. 3.

For the purpose of advancing the exhaust in what is known as super-charging, my present structure includes means which is peculiarly well adapted for adjusting the upper crank shaft in the given direction of rotation thereof and thereby changing the timing of the upper pistons with respect to the exhaust. With this in mind, I have provided one of the crank disks 6a in split circular form, as indicated in Figs. 1 and 11 hereof; and one of these two companion disks is provided with a circular series of closely arranged holes 6b about the margin thereof while the other of these two companion disks has a bolt and nut 6c adapted to be secured in any one of the holes 6b according to the relative position desired therefor with respect to the other companion disk member. Thus the upper crank shaft may be adjusted as desired for the purpose stated; and this convenient and effective means of adjustment is made possible by the fact that the center or axis of adjustment of the two-part disk 6a is the center also of the circular paths described by the connections A, B and C between the other crank disks 6', as indicated in Figs. 5 and 11 of the present drawings.

In operating this engine, it is to be understood that the compressed air will be cut off as soon as the proper operation of the engine has been effected and that the operation of the engine will be continued at the desired speed by manipulation of the throttle of the fuel supply means in the regular and well-known manner. A single conveniently located throttle lever and other means of control and regulation may be provided for both fuel pumps as a unit, the fuel pumps themselves being of conventional form.

My present motor possesses numerous practical advantages as compared with any and all other diesel motors known to me and some of these advantages will now be briefly noted while others will no doubt suggest themselves to those who are familiar with the art to which the present invention relates. For instance, due to my three-throw link mechanism, the present motor requires less space per horse-power, which is a very important consideration especially in submarines and locomotives; and the present motor is positive and dependable in its operation, with a decided reduction in the factor of torsional reaction. My present form of structure is peculiarly well adapted for adjusting the crank shaft in effecting the advancement of the exhaust in super-charging. My present motor has at least one-third fewer parts than any other diesel motor known to me, and the heretofore troublesome cylinder heads and valve mechanism have been eliminated in a practical manner. Also, in my present motor, the explosive forces are equalized.

My present improved single and positive system for circulating the cooling oil to and from the pistons, provides a higher speed of operation and makes possible greater horse-power output. For instance, with my present design of motor, there is contemplated a high pressure oiling system of from 500 to 1,000 pounds per square inch with an anticipated 7,500 horse-power at 1,000 R. P. M. The utilization of the exhaust gases as a means of operating the high-pressure air-turbine for scavenging and super-charging the compression chambers, constitutes another improvement, as does also my simplified means for starting and reversing and the accompanying means for ensuring uni-directional operation of the water and lubricating pumps. My particular form of piston ring in this particular organization and my particular arrangement of fuel-injecting means for the compression chambers, provide further efficiency with respect to combustion and general performance.

What I claim is:

1. In a diesel motor, the combination of a plurality of cylinders, a pair of pistons in each of said cylinders with their compression ends facing each other to provide a common compression chamber therebetween, means for introducing combustible fuel into the several compression chambers in accordance with a predetermined timing, a driven shaft extending at ninety degrees to the direction of movement of said pistons and located midway between the opposite ends of said cylinders, a connecting rod for each of said pistons, crank shafts for the outer ends of said connecting rods, and means including three-throw link mechanism providing operating connection between said crank shafts and said driven shaft.

2. In a diesel motor, the combination of a plurality of cylinders, a pair of pistons in each of said cylinders with their compression ends facing each other so as to provide a common compression chamber therebetween, means for introducing combustible fuel into the several compression chambers in accordance with a predetermined timing, a driven shaft, a connecting rod for each of said pistons, crank mechanism providing operative connection between the outer ends of the said connecting rods and said driven shaft, said pistons, connecting rods and crank mechanism being provided with lubricating passages, and means for forcing a lubricating medium through said passages under pressure.

3. In a diesel motor, the combination of a plurality of cylinders, a pair of pistons in each of said cylinders with their compression ends facing each other so as to provide a common compression chamber therebetween, means for introducing combustible fuel into the several compression chambers in accordance with a predetermined timing, a driven shaft, a connecting rod for each of said pistons, crank mechanism providing operative connection between the outer ends of said connecting rods and said driven shaft, said pistons, connecting rods and crank mechanism being provided with lubricating passages, a lubricant reservoir, means for forcing a lubricant from said reservoir under pressure through said passages, and means for returning the lubricant to said reservoir.

4. In a diesel motor, the combination of a plurality of cylinders, a pair of pistons in each of said cylinders with their compression ends facing each other so as to provide a common compression chamber therebetween, means for introducing combustible fuel into the several compression chambers in accordance with a predetermined timing, a driven shaft, a connecting rod for each of said pistons, crank mechanism providing operative connection between the outer ends of said connecting rods and said driven shaft, said pistons, connecting rods and crank mechanism being provided with lubricating passages, a lubricant reservoir, means for forcing a lubricant from said reservoir under pressure through said passages, and means for removing excess lubricant from said pistons and for returning the lubricant to said reservoir.

5. In a diesel motor, the combination of a plurality of cylinders, a pair of pistons in each of said cylinders with their compression ends facing each other so as to provide a common compression chamber therebetween, pump means for introducing fuel into the several compression chambers in accordance with a predetermined timing, a driven shaft, means of operative connection between said pistons and said driven shaft, lubricant pump means, means for operating said pump means from said driven shaft, and means for reversing the direction of operation of said driven shaft and for maintaining the direction of said lubricant pump operation unchanged.

6. In a diesel motor, the combination of a plurality of cylinders, a pair of pistons in each of said cylinders with their compression ends facing each other so as to provide a common compression chamber therebetween, a driven shaft, means of operative connection between said pistons and said driven shaft, said means of operative connection being provided with passages for distribution of a lubricant therethrough, pump means for forcing a lubricant through said passages and for introducing combustible fuel into the several compression chambers in accordance with a predetermined timing, means for operating said pump means from said driven shaft, and means for reversing the direction of operation of said driven shaft and for maintaining the direction of said lubricant pump operation unchanged.

7. In a diesel motor, the combination of a plurality of cylinders, a pair of pistons in each of said cylinders with their compression ends facing each other so as to provide a common compression chamber therebetween, a driven shaft, means of operative connection between said pistons and said driven shaft, said means of operative connection being provided with passages for distribution of a lubricant therethrough, pump means for forcing a lubricant through said passages and for introducing a combustible fuel into the several compression chambers in accordance with a predetermined timing, means for operating said pump means from said driven shaft, and air-actuated means including air-control valve means for reversing the direction of operation of said driven shaft and for maintaining the direction of said lubricant pump operation constant, the valve means for maintaining the direction of said pump operation constant being timed in its operation in advance of that of the valve means for reversing the direction of said driven shaft.

8. In a diesel motor, the combination of a plurality of cylinders, a pair of pistons in each of said cylinders with their compression ends facing each other so as to provide a common compression chamber therebetween, a dry liner for each of said cylinders, a graphite ring upon each of said pistons for sealing engagement with said liner, and means for introducing combustible fuel into the successive compression chambers in accordance with a predetermined timing.

9. In a diesel motor, the combination of a plurality of vertically disposed cylinders, a pair of pistons in each of said cylinders with their compression ends facing each other so as to provide a common compression chamber therebetween, a connecting rod for each of said pistons, upper and lower crank shafts arranged above and below said cylinders, operative connections between said connecting rods and said crank shafts, said pistons, connecting rods, crank shafts and operative connections being provided with lubricating passages, a lubricant reservoir, and a unitary means for forcing a lubricant from said reservoir under pressure through said passages and for returning the lubricant to said reservoir.

10. The same structure as recited in claim 9 hereof and in which there is included also means operated by the reciprocatory movement of the upper pistons for discharging the lubricant from the upper pistons.

11. The same structure as recited in claim 9 hereof and in which there is included also in each of the lower pistons an oscillatory valve means operated by the movement of the piston upon its pin for controlling the flow of the lubricant through the piston.

12. The same structure as recited in claim 9 hereof and in which there is included also means operated by the reciprocatory movement of the upper pistons for discharging the lubricant from the upper pistons, and in which there is included also means in each of the lower pistons that is actuated by the oscillating movement of the piston upon its pin for controlling the flow of the lubricant through the piston.

13. In a diesel motor, the combination of a plurality of cylinders, a pair of pistons in each of said cylinders with their compression ends facing each other so as to provide a common compression chamber therebetween, a driven shaft, means of operative connection between said pistons and said driven shaft, said means of operative connection being provided with passages for distribution of a lubricant therethrough, pump means for forcing a lubricant through said passages, pump means for introducing combustible fuel into the several compression chambers in accordance with a predetermined timing, means for operating said pump means from said driven shaft, means for supplying compressed air to said cylinders in predetermined sequence for starting the operation of the engine, means for simultaneously setting said air-supplying means and fuel-supplying means for either forward or reverse direction of operation and for maintaining the direction of said lubricant pump means constant.

14. In a diesel motor, the combination of a plurality of cylinders, a pair of pistons in each of said cylinders with their compression ends facing each other so as to provide a common compression chamber therebetween, means for introducing combustible fuel into the several compression chambers in accordance with a predetermined timing, a driven shaft extending at ninety degrees to the direction of movement of said pistons and located midway between the opposite ends of said cylinders, a connecting rod for each of said pistons, crank shafts for said connecting rods, means including three-throw link mechanism providing operative connection between said crank shafts and said driven shaft, the points of pivotal connection for said three-throw link mechanism being arranged co-axially with respect to the axes of said crank shafts, said three-throw link mechanism including a two-part means arranged between the end of one of said crank shafts and said other three-throw links and co-axially with respect to its crank shaft, the parts of said two-part means being relatively rotatably adjustable, and means for securing said two-part means in adjusted position.

15. In a device of the class described, the combination of a plurality of cylinders and pistons therefor, means for introducing fuel into said cylinders in accordance with a predetermined timing, a driven shaft, means of operative connection between said pistons and driven shaft, lubricant pump means, means for operating said pump means from said driven shaft, and means for reversing the direction of operation of said driven shaft and for maintaining the direction of said lubricant pump operation unchanged.

16. In a device of the class described, the combination of a plurality of cylinders and pistons therefor, a driven shaft, means of operative connection between said pistons and said driven shaft, said means of operative connection being provided with passages for distribution of a lubricant therethrough, pump means for forcing a lubricant through said passages, means for introducing combustible fuel into said cylinders in accordance with a predetermined timing, means for supplying compressed air to said cylinders in predetermined sequence for starting the operation of the engine, means for simultaneously setting said air-supplying means and fuel-supplying means for either forward or reverse direction of operation and for maintaining the direction of said lubricant pump means constant.

STEPHEN JENCICK.

REFERENCES CITED

The following references are of record in the file of this patent:

UNITED STATES PATENTS

| Number | Name | Date |
|---|---|---|
| 670,966 | Pender | Apr. 2, 1901 |
| 1,464,268 | Keller | Aug. 7, 1923 |
| 1,814,802 | Herr | July 14, 1931 |
| 2,216,074 | Garve et al. | Sept. 24, 1940 |
| 2,349,170 | Jackman | May 16, 1944 |
| 2,419,192 | Anderson | Apr. 22, 1947 |
| 2,423,395 | Lieberherr | July 1, 1947 |